US012757886B2

(12) United States Patent
Bacle et al.

(10) Patent No.: US 12,757,886 B2
(45) Date of Patent: Oct. 13, 2026

(54) AGRICULTURAL SPRAYING SYSTEM USING A FLUSHING LIQUID AS ACTIVE PRODUCT CARRIER LIQUID

(71) Applicant: EXEL INDUSTRIES, Epernay (FR)

(72) Inventors: Thibault Bacle, Lyons (FR); Mathieu Parlant, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 163 days.

(21) Appl. No.: 18/916,199

(22) Filed: Oct. 15, 2024

(65) Prior Publication Data

US 2025/0134088 A1 May 1, 2025

(51) Int. Cl.
*A01M 7/00* (2006.01)
*B05B 7/24* (2006.01)

(52) U.S. Cl.
CPC ........ *A01M 7/0032* (2013.01); *A01M 7/0092* (2013.01); *B05B 7/2443* (2013.01); *B05B 7/2472* (2013.01)

(58) Field of Classification Search
CPC .............. A01M 7/0032; A01M 7/0053; A01M 7/0082; A01M 7/0092; B05B 7/2443; B05B 7/2472
USPC ......... 239/69, 124, 127, 159, 172, 303, 304, 239/310, 550
See application file for complete search history.

(56) References Cited

U.S. PATENT DOCUMENTS 4,714,196 A * 12/1987 McEachern ......... A01M 7/0092 239/304
7,124,961 B2 * 10/2006 Wilting ............... A01M 7/0089 239/303
8,800,887 B2 * 8/2014 Moeller ............. A01M 7/0089 239/69
2006/0086296 A1 4/2006 Wichmann
2023/0019528 A1 1/2023 Pitaud

FOREIGN PATENT DOCUMENTS

DE 102017220002 A1 5/2019
EP 3114930 A1 1/2017
EP 3818825 A1 5/2021

OTHER PUBLICATIONS

French Search Report for French Patent Application FR2311675 (dated May 8, 2024).

* cited by examiner

*Primary Examiner* — Steven J Ganey
(74) *Attorney, Agent, or Firm* — Alumen IP Law PC

(57) ABSTRACT

The present invention relates to an agricultural spraying system, comprising:

a reservoir configured to contain a product, the reservoir being connected to a first downstream duct configured to convey the product to a mixing area;

a first tank configured to contain a clear liquid, the first tank being connected to a first upstream duct configured to convey clear liquid to the reservoir so that the clear liquid flushes the reservoir, forming a grey liquid;

the system wherein the first downstream duct comprises an element configured to direct the grey liquid to at least a second tank connected to a second downstream duct configured to convey the grey liquid to the mixing area.

8 Claims, 4 Drawing Sheets

AGRICULTURAL SPRAYING SYSTEM USING A FLUSHING LIQUID AS ACTIVE PRODUCT CARRIER LIQUID

TECHNICAL FIELD

The present invention relates to the technical field of agricultural spraying systems.

More specifically, the invention relates to the flushing of an agricultural spraying system and the reuse of a liquid used for said flushing.

BACKGROUND

An agricultural spraying system for an active product such as a phytosanitary liquid is known in the state of the art, e.g. supported on an agricultural machine circulating in rows of plant crops. Such a system comprises, in particular, a spraying assembly, formed for example from a boom and a plurality of spraying nozzles configured to spray the phytosanitary liquid. Such a liquid is usually stored in a reservoir, and to be sprayed on the crops to be treated, the phytosanitary liquid is incorporated into a carrier liquid, usually water, in predetermined and precise proportions. Advantageously, it is known that the incorporation is to be carried out before the start of a spraying operation, i.e. before the departure of the agricultural machine towards the rows of plant crops to be sprayed. The spraying system and the agricultural machine carry then a defined quantity of mixture, the concentration of which is defined and substantially constant.

When the spraying operation is complete and the reservoir is emptied of its active product, it is necessary, for regulatory reasons, to clean the reservoir of active product and the ducts of the agricultural spraying system in order to remove stagnant active product residues. Indeed, stagnant active product in the ducts can degrade the service life of the agricultural spraying system. In fact, an agricultural spraying system further including a pneumatic circuit is known in the state of the art, said pneumatic circuit being connected to the reservoir and ducts, and configured to inject a gas such as air in such a way as to evacuate stagnant residues of phytosanitary product through the nozzles of the spraying assembly, especially after a water flushing operation.

Such a spraying system has the advantage of improving the efficiency of the reservoir flushing, eliminating stagnant residues, thus preventing clogging of the ducts and the reservoir. In addition, care is also taken not to alter the chemical balance of an active product configured to be sprayed later with the same spraying system.

However, the evacuated residues are also sprayed on the plant crops that have already received an adequate dose of active product, which represents a waste of active product, thus reducing the profitability of the spraying system. Furthermore, when reusing the equipment for a new spraying operation on different plant crops using a different active product, the presence of residues, even in small quantities, presents a risk of phytotoxicity for said plant crops.

The invention aims to solve all or part of the disadvantages of the state of the art, by providing a spraying system allowing to avoid the waste of active product residues.

SUMMARY

More specifically, the invention relates to an agricultural spraying system, comprising:

- at least one reservoir configured to contain an active product, the reservoir being connected to a first portion of a first downstream duct configured to convey the active product from the reservoir to at least a mixing area of a spraying assembly of the spraying system;
- a first tank configured to contain a clear liquid, the first tank being connected to a first upstream duct configured to convey clear liquid from the first tank to the reservoir so that the clear liquid flushes the reservoir, forming a grey liquid from active product residues mixed with the clear liquid.

The system is characterized in that the first downstream duct comprises a regulating element configured to direct, through a second portion of the first downstream duct, the grey liquid towards at least one second tank configured to contain the grey liquid, the second tank being connected to a second downstream duct configured to convey the grey liquid from the second tank to the mixing area upstream of the spraying assembly, so that the grey liquid performs the function of carrier liquid in which the active product is mixed, the grey liquid incorporating the active product configured to be sprayed by the spraying assembly.

The term «clear liquid» means a liquid that is free of any active product circulating in the agricultural spraying system, for example water.

The term «grey liquid» means a liquid comprising an active product concentration that is significantly lower than the active product concentration incorporated into a carrier liquid, so that its use does not interfere with the dosage of the mixture. For example, the active product concentration in the «grey liquid» is at least 1000 times, preferably at least 10000 times lower than in the sprayed mixture. In the reservoir, we speak of grey liquid as soon as the clear liquid comes into contact with residues of active product.

By "reservoir", we mean any container of active product, including potentially any type of commercially available standard can containing active product. The term "reservoir" also covers a tank into which active product is transferred, in particular from a can.

Due to such a combination of characteristics, the ducts and reservoirs of such a spraying system have the advantage that they can be effectively flushed by means of clear liquid, which preserves the components of the agricultural spraying system, and does not alter the chemical balance of an active product that subsequently circulates in the reservoirs and ducts.

Advantageously, the first tank is connected to a second upstream duct configured to convey clear liquid from the first tank to the second tank. In such a configuration, a sufficient volume of grey liquid can be guaranteed to ensure the function of carrier liquid, in particular by supplementing a free volume of the second tank with clear liquid. Preferably, the volume of the first tank is greater than the volume of the second tank.

Advantageously, the first tank is pressurized by means of a pressure member from the first tank configured to control a flow of clear liquid to the first upstream duct and a flow of clear liquid to the second upstream duct. In such a configuration, it is possible to guarantee the presence of a minimum volume of clear liquid in the second tank, so that the concentration of active product residues in the grey liquid of the second tank is very much lower than a reference concentration. The first tank can advantageously include more than one pressure member, for example so that another pressure member is configured to drive a flow of clear liquid from the first tank to the second tank.

Advantageously, the reservoir is pressurized by means of a reservoir pressure member configured to drive a flow of active product from the reservoir to the first portion of the first downstream duct and/or a flow of grey liquid from the reservoir to the second portion of the first downstream duct. In such a configuration, it is possible to control the flow of active product conveyed to the mixing area, allowing accurate dosage. In addition, when the reservoir is being flushed, it is also possible to control the flow of grey liquid conveyed to the second tank.

Advantageously, the first upstream duct is directly connected to the first downstream duct upstream of the regulating element, the first upstream duct comprising a stop valve configured to allow the clear liquid to be conveyed from the first upstream duct directly to the first downstream duct so that the clear liquid flushes the first downstream duct, forming the grey liquid from active product residues mixed with the clear liquid. In such a configuration, it is possible to flush the downstream duct directly, without the liquid having previously circulated in the reservoir(s), reinforcing the efficiency of the flushing.

Advantageously, the second tank is connected to a recirculation duct.

Advantageously, the system includes at least two reservoirs. In such a configuration, the use of each reservoir is independent of the other reservoirs. For example, the flushing of one reservoir and the spraying of an active product from another reservoir can be carried out simultaneously. Thus, grey liquid providing the function of carrier liquid can be formed concomitantly with a spraying operation.

According to one embodiment, it is possible to anticipate the end of the spraying operation and to start flushing the second tank. Thus, when the end of the worksite is near, i.e. when the spraying operation of a plot is almost completed, the second tank containing the grey liquid is gradually emptied, so that it is empty or almost empty at the end of the worksite. It is clear that in order to be emptied, the second tank is no longer supplied with grey liquid by the first downstream duct.

Advantageously, the first portions of the first downstream ducts connected to each reservoir are converging upstream of the mixing area of the spraying assembly and the second portions of the first downstream ducts are converging upstream of the second tank. In such a configuration, the architecture of the first downstream duct upstream of the mixing zone is simplified and has a better compactness.

BRIEF DESCRIPTION OF THE DRAWINGS

The invention will be better understood by reading the following description, given by way of example only, and referring to the annexed drawings given by way of non-exhaustive examples, in which identical references are given to similar objects and on which.

It should be noted that the figures set out the invention in detail to enable the invention to be implemented; although not exhaustive, said figures are used particularly to better define the invention where appropriate.

DETAILED DESCRIPTION

Figure 1:
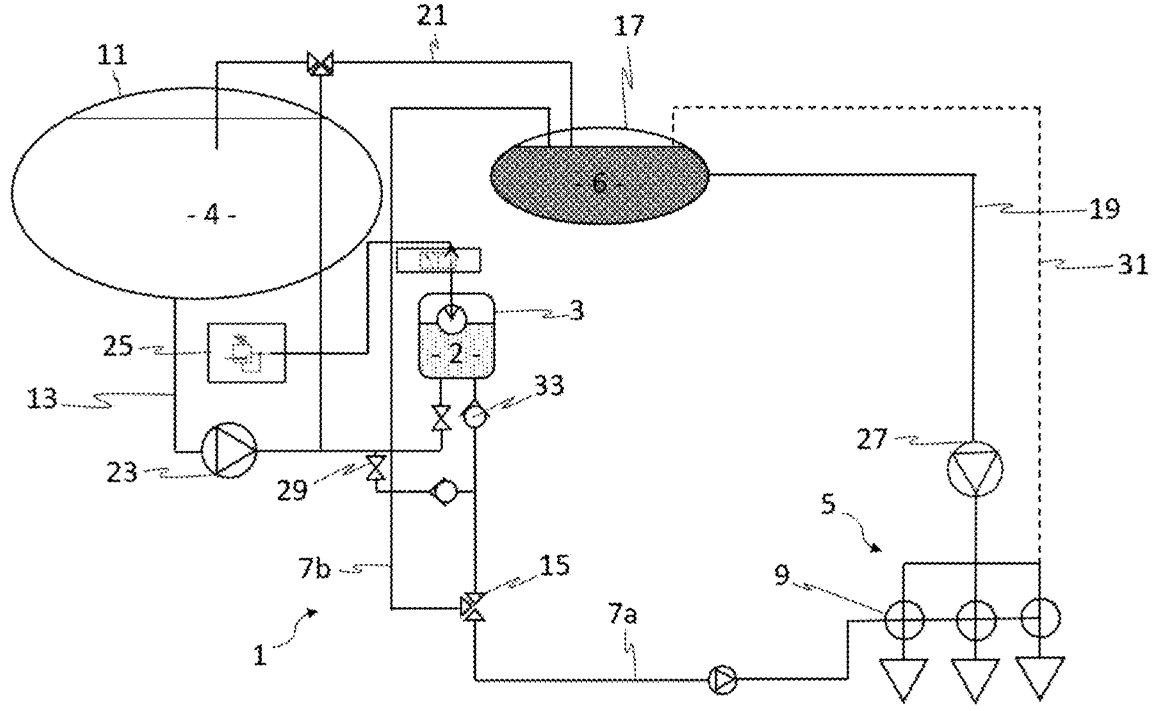
FIG. 1 is a schematic representation of an agricultural spraying system according to a first embodiment of the invention, in an initial configuration.

The invention relates to an agricultural spraying system 1 illustrated according to a first embodiment in FIG. 1. For example, the agricultural spraying system 1 is fitted on board an agricultural machine circulating in plots of plant crops.

The spraying system 1 comprises at least a first reservoir 3 configured to contain active product 2, particularly a phytosanitary treatment product for plant crops. The reservoir 3 is connected to a first portion 7*a* of a first downstream duct configured to convey active product 2 from the reservoir 3 to at least one mixing area 9 of a spraying assembly 5. The spraying assembly 5 advantageously comprises a spray boom as well as a plurality of nozzles configured to spray the active product 2 incorporated into a carrier liquid. The reservoir 3 has a spray configuration to carry out a spraying operation, and has a flushing configuration to be the subject of a partial or total flushing operation.

The spraying system 1 further comprises a first tank 11 configured to contain a clear liquid 4. The clear liquid 4 is a liquid devoid of any active product 2, e.g. water. The first tank 11 is connected to a first upstream duct 13 configured to convey clear liquid 4 from the first tank 11 to the reservoir 3 for a flushing operation. During such an operation, the reservoir 3 contains only a minority fraction of active product 2, i.e. residues of active product 2 present on the walls of the reservoir 3. During such a flushing, a grey liquid 6 is formed from the residues of active product 2 mixed with clear liquid 4. The liquid is said to be grey liquid 6 as soon as the clear liquid 4 comes into contact with the residues of the active product 2. Advantageously, the first upstream duct 13 includes a stop valve configured to allow the passage of clear liquid 4 to the reservoir 3 only when the reservoir 3 contains only residues of active product 2.

The first downstream duct comprises a regulating element 15 configured to direct, by means of a second portion 7*b* of the first downstream duct, the grey liquid 6 towards a second tank 17 configured to contain the grey liquid 6. In other words, the regulating element 15 in a spraying configuration, directs the active product 2 towards the mixing area 9 by means of the first portion 7*a* of the first downstream duct and directs the grey liquid 6 to the second tank 17 in a flushing configuration. During a spraying operation, the second tank 17 can advantageously contain grey liquid 6 formed during a previous flushing operation.

The second tank 17 is further connected to a second downstream duct 19 configured to convey the grey liquid 6 to the mixing area 9, upstream of the spraying assembly 5. The grey liquid 6 then ensures the function of carrier liquid in which the active product 2 is mixed, the grey liquid 6 incorporating the active product 2 configured to be sprayed by the spraying assembly 5.

The ducts and reservoir 3 of such a spraying system have the advantage that they can be flushed efficiently by means of clear liquid 4, which preserves the components of the agricultural spraying system 1, and does not alter the chemical balance of an active product 2 subsequently circulating in the reservoir 3 and the ducts, which can lead to risks of phytotoxicity. Finally, the agricultural spraying system 1 allows the use of a grey liquid 6 as a priority, before consuming clear liquid 4, allowing better management of the stock of clear liquid 4.

In the described embodiment, the first tank 11 is further advantageously connected to a second upstream duct 21 configured to convey clear liquid 4 from the first tank 11 to the second tank 17. Thus, it is possible to guarantee a volume of grey liquid 6 sufficient to ensure the function of carrier liquid, in particular by supplementing a free volume of the second tank 17 with clear liquid 4, so that the residue concentration of active product 2 is very much lower than the concentration of active product 2 in the carrier liquid. Preferably, the volume of the first tank 11 is greater than the volume of the second tank 17.

In the described embodiment, the reservoir 3 is advantageously pressurized by means of a pressure member 25 of the reservoir 3. In spray configuration, the pressure member 25 is configured to drive a flow of active product 2 from the reservoir 3 to the first portion 7*a* of the first downstream duct when the spraying system 1 is in spray configuration.

According to an embodiment, the reservoir 3 is provided with a closing device cooperating with the pressure member 25 of the reservoir 3 and with a membrane capable of expanding and contracting inside the reservoir 3, the membrane being inflated so as to impose an overpressure inside the reservoir 3 to generate the flow of active product 2 exiting the reservoir 3 in spray configuration.

In flushing configuration, the pressure member 23 is further configured to drive a flow of grey liquid 6 exiting the reservoir 3 towards the second portion 7*b* of the first downstream duct. Thus, it is possible to control the flow rate of active product 2 conveyed to the mixing area 9, with another reservoir 3 than the reservoir 3 being flushed. In addition, when the reservoir 3 is being flushed, it is further possible to control the flow of grey liquid 6 conveyed to the second tank 17.

In the described embodiment, the first tank 11 is advantageously pressurized by means of a pressure member 23 of the first tank 11 configured to drive a flow of clear liquid 4 to the first upstream duct 13 and a flow of clear liquid 4 to the second upstream duct 21.

In the described embodiment, the second tank 17 is advantageously pressurized by means of a pressure member 27 of the second tank 17 configured to drive a flow of grey liquid 6 towards the second downstream duct 19. The flow rate of the flow of grey liquid 6 driven by the pressure member 27 of the second tank 17 can advantageously be greater than the sum of the flow rate of the flow of the clear liquid 4 driven by the pressure member 23 of the first tank 11 and the flow rate of the flow of grey liquid 6 driven by the pressure member 25 of the reservoir 3. Thus, the grey liquid 6 has a flow rate necessary to incorporate the active product 2 into the mixing area 9 and to convey the grey liquid 6 into the spray assembly 5.

In the described embodiment, the first upstream duct 13 is advantageously connected directly to the first downstream duct, upstream of the regulating element 15, i.e. before the separation between the two separate branches formed by the first portion 7*a* and the second portion 7*b*. The first upstream duct 13 then comprises a stop valve 29. The stop valve 29 is configured to allow clear liquid 4 to be conveyed directly from the first upstream duct 13 to the first downstream duct, so that the clear liquid 4 flushes the first downstream duct. Here, the second tank 17 advantageously comprises a recirculation duct 31.

Figure 2:
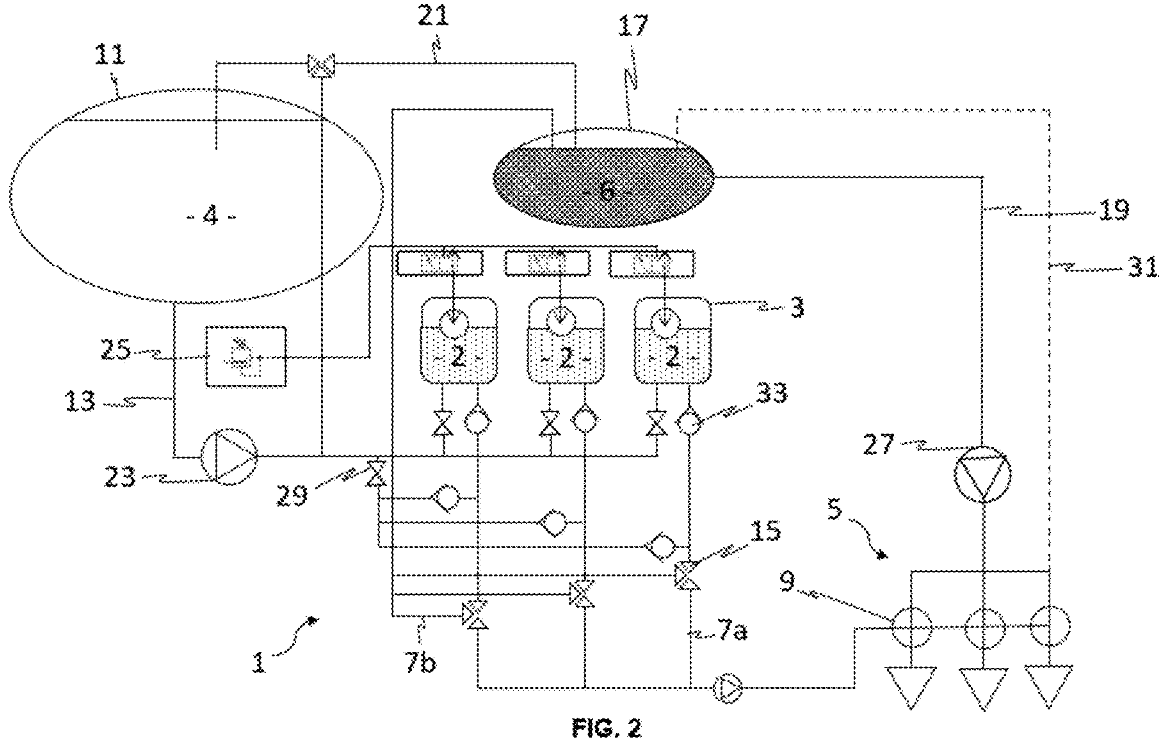
FIG. 2 is a schematic representation of an agricultural spraying system according to a second embodiment of the invention, in an initial configuration.

FIG. 2 illustrates the agricultural spraying system 1 according to a second embodiment. The embodiment of FIG. 2 differs from the embodiment of FIG. 1 particularly in that it comprises at least two reservoirs 3, here three reservoirs 3. In this embodiment, the use of each reservoir 3 is independent of other reservoirs 3. For example, the flushing of a reservoir 3 and the spraying of active product 2 from another reservoir 3 can be carried out simultaneously. This configuration has the advantage of allowing the formation of grey liquid 6 from the flushing of a given reservoir 3 to ensure the function of carrier liquid concomitantly with a spraying operation requiring the conveyance of active product 2 from a non-empty reservoir 3.

In the described embodiment, the first portions 7*a* of the first downstream ducts converge upstream of the mixing area 9 and the second portions 7*b* of the first downstream ducts converge upstream of the second tank 17. In such a configuration, the architecture of the first downstream duct upstream of the mixing area 9 is simplified and has a better compactness.

The rest of the description focuses on detailing the operating principle of the agricultural spraying system 1. In FIG. 1 and FIG. 2, the spraying system 1 is in an initial configuration, i.e., a configuration prior to any crop plot spraying and any flushing operations. The first tank 11 is filled with clear liquid 4. The second tank 17 is initially filled with grey liquid 6 formed during a previous flushing operation of the spray system or with clear liquid 4. The reservoirs 3 are filled with active product 2.

Figure 3:
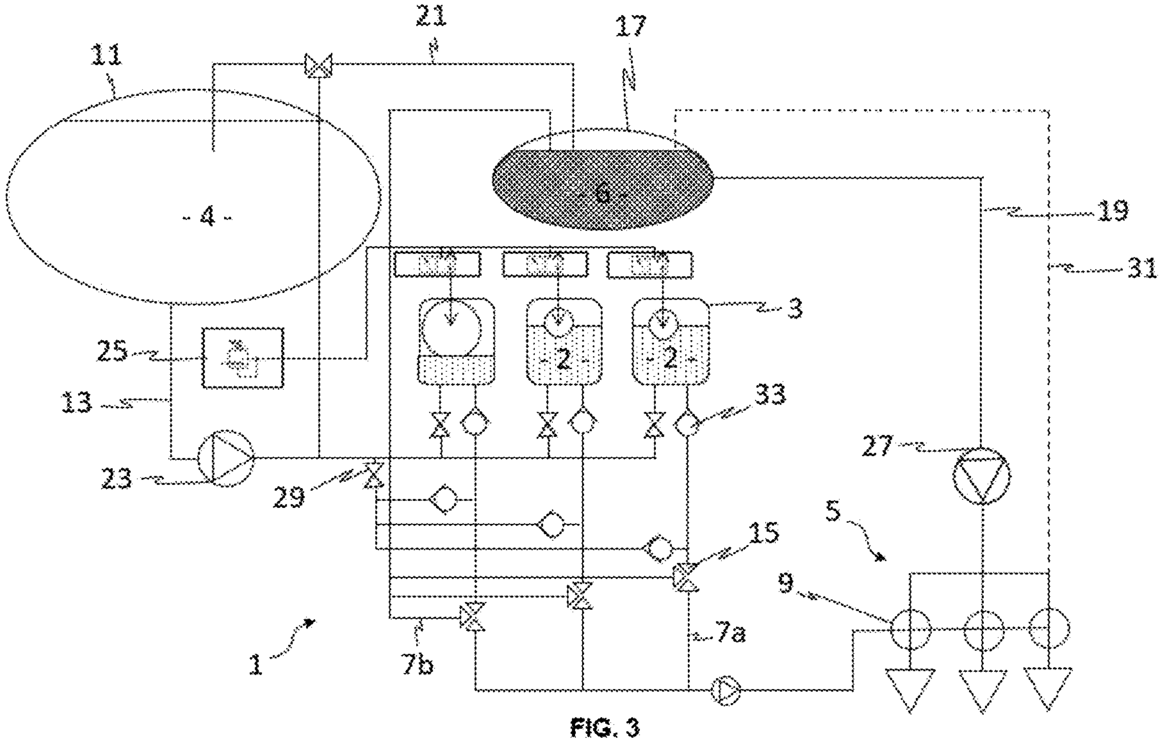
FIG. 3 is a schematic representation of the agricultural spraying system in FIG. 2 in a first operating configuration.

FIG. 3 illustrates the agricultural spraying system 1 in an initial configuration. Here, the active product 2 is conveyed from a first reservoir 3 to the mixing area 9 by means of the first downstream duct. The regulating element 15 directs the active product 2 towards the first portion 7*a*. In parallel, the second downstream duct 19 conveys the grey liquid 6 towards the mixing area 9 of the spraying assembly 5. The active product 2 is incorporated into the grey liquid 6 in the mixing area 9 and is ready to be sprayed.

Figure 4:
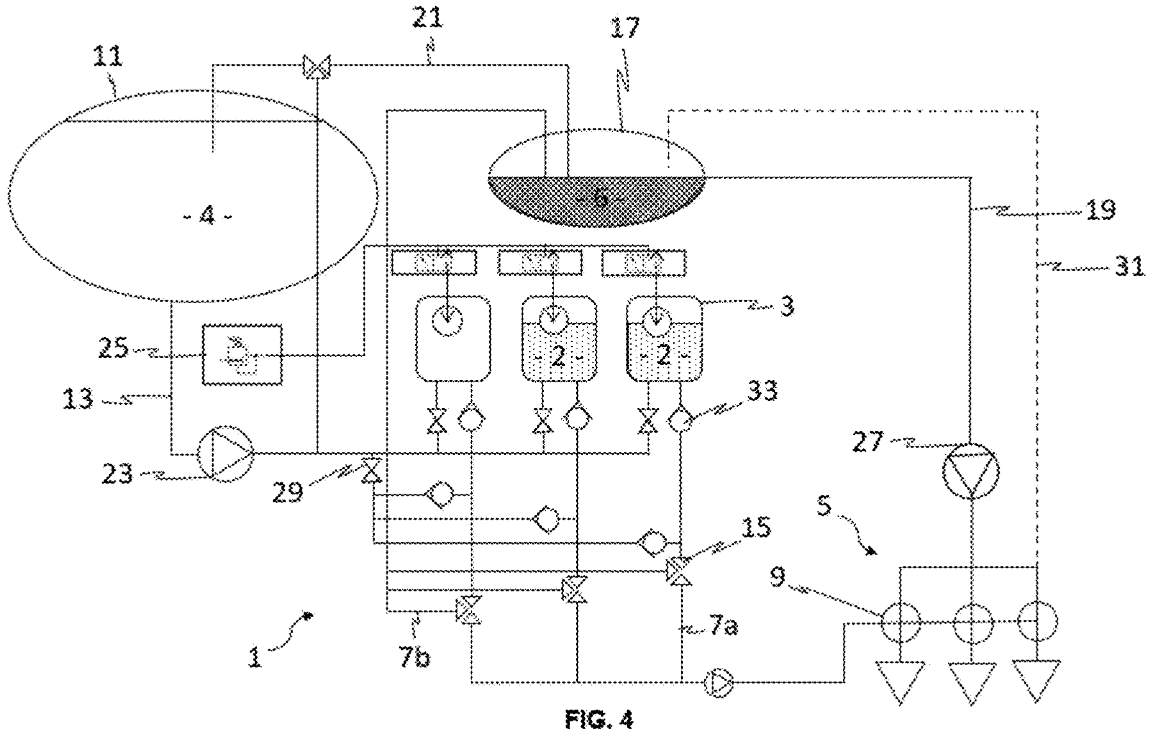
FIG. 4 is a schematic representation of the agricultural spraying system in FIG. 2 in a second operating configuration.
Figure 5:
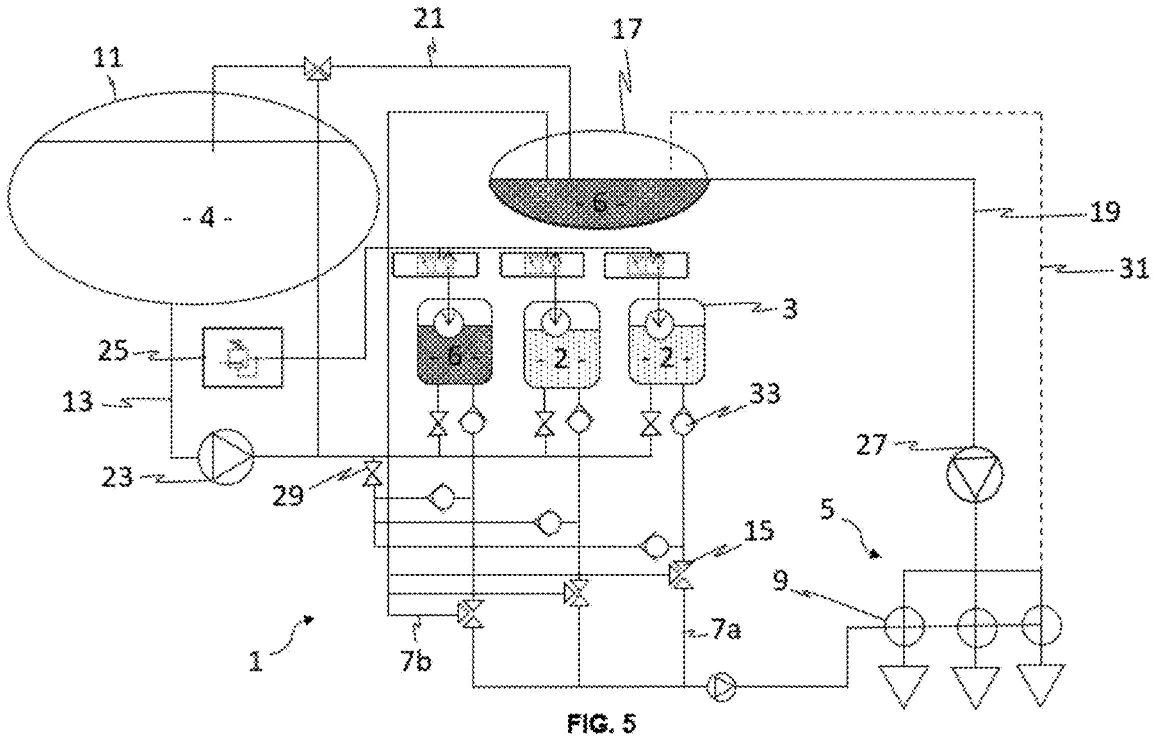
FIG. 5 is a schematic representation of the agricultural spraying system in FIG. 2 in a third operating configuration.
Figure 6:
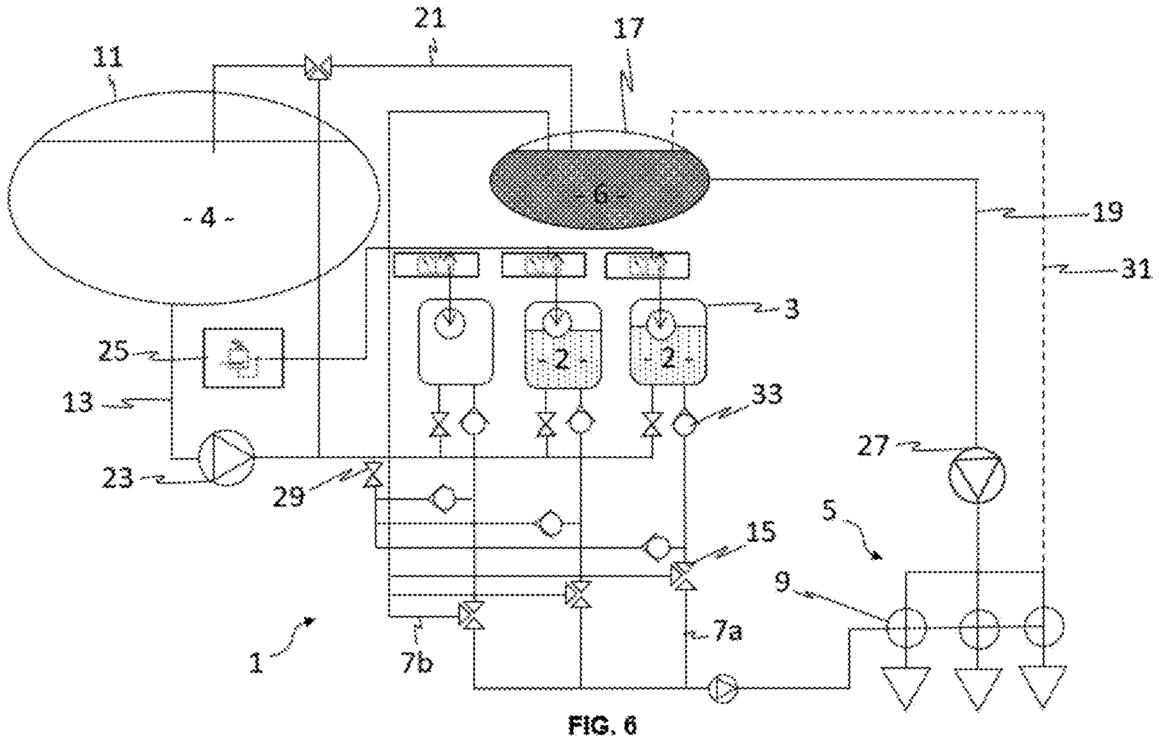
FIG. 6 is a schematic representation of the agricultural spraying system in FIG. 2 in a fourth operating configuration.

FIG. 4 illustrates the agricultural spraying system 1 in a second configuration. Here, the first reservoir 3 is emptied, and contains only residues of active product 2. The first duct then conveys clear liquid 4 to the first reservoir 3, forming the grey liquid 6 when the clear liquid 4 comes into contact with the residue of active product 2, as shown in FIG. 5 in a third configuration of the agricultural spraying system 1. FIG. 6 illustrates the agricultural spraying system 1 in a fourth configuration. The clear liquid 4 flushes the walls of the first reservoir 3 and is conveyed to the first downstream duct. The regulating element 15 directs the grey liquid 6 resulting from the flushing of the first reservoir 3 to the second portion 7*b*, to the second tank 17. It should be noted that in the event that the spraying system 1 comprises at least two reservoirs 3, the active product from the second reservoir 3 can be conveyed to the mixing area 9 concomitantly with the flushing operation described in FIG. 6, as explained above.

Figure 7:
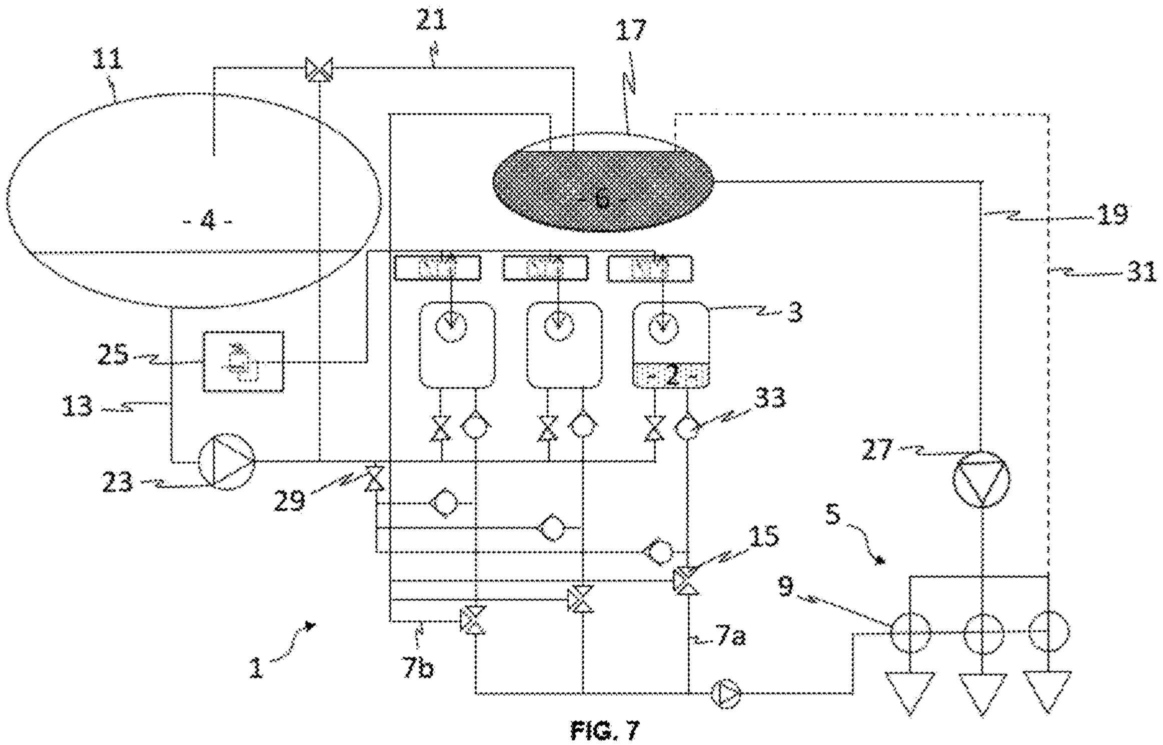
FIG. 7 is a schematic representation of the agricultural spraying system in FIG. 2 in a fifth operating configuration.
Figure 8:
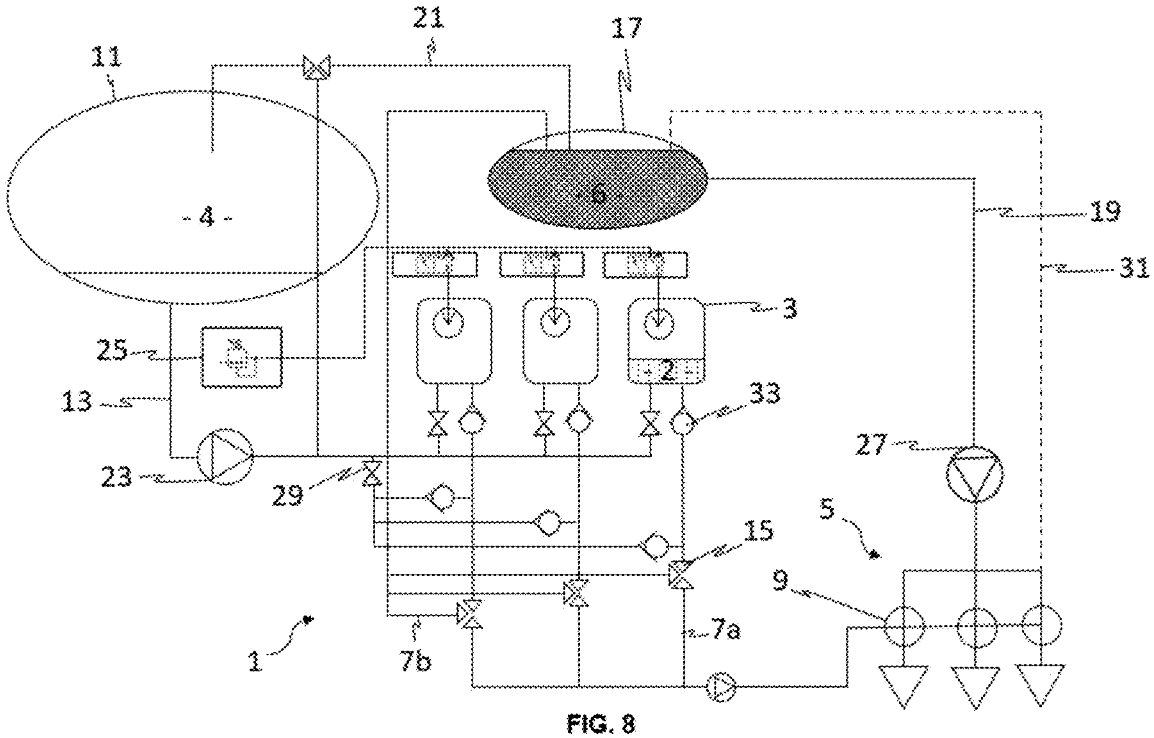
FIG. 8 is a schematic representation of the agricultural spraying system in FIG. 2 in a final configuration.

FIG. 7 illustrates the agricultural spraying system 1 in a fifth configuration. Here, the spraying operation is completed. The first and second reservoirs 3 are emptied and flushed, and a surplus of active product 2 is kept in the third reservoir 3, which can be used during a next spraying operation. As explained above, it is necessary to replenish a satisfactory stock of grey liquid 6 for said next spraying operation. Thus, the second upstream duct 21 conveys clear liquid 4 directly to the second tank 17, as shown in FIG. 8, in a final configuration of the agricultural spray system 1. The grey liquid 6 is then diluted with clear liquid 4 directly into the second tank 17, which can be filled to its maximum volume.

It will also be noted that the invention is not limited to the embodiments described above. It will indeed appear to those skilled in the art that various modifications can be made to the embodiment described above, in the light of the teaching which has just been disclosed to them.

In the detailed presentation of the invention above, the terms used must not be interpreted as limiting the invention to the embodiment set out in the present description, but must be interpreted to include all the equivalents which can be foreseen by those skilled in the art by applying their general knowledge to the implementation of the teaching which has just been disclosed to them.

The invention claimed is:

1. An agricultural spraying system, comprising:

at least one reservoir configured to contain an active product, the reservoir being connected to a first portion of a first downstream duct configured to convey the active product from the reservoir to at least one mixing area of a spraying assembly of the spraying system;

a first tank configured to contain a clear liquid, the first tank being connected to a first upstream duct configured to convey clear liquid from the first tank to the reservoir so that the clear liquid flushes the reservoir, forming a grey liquid from residues of active product mixed with the clear liquid;

the system wherein the first downstream duct comprises a regulating element configured to direct, by means of a second portion of the first downstream duct, the grey liquid to at least one second tank configured to contain the grey liquid, the second tank being connected to a second downstream duct configured to convey the grey liquid from the second tank to the mixing area upstream of the spraying assembly, such that the grey liquid provides the function of carrier liquid in which the active product is mixed, the grey liquid incorporating the active product being configured to be sprayed by the spraying assembly.

2. The spraying system according to claim 1, wherein the first tank is connected to a second upstream duct configured to convey clear liquid from the first tank to the second tank.

3. The spraying system according to claim 2, wherein the first tank is pressurized by means of a pressure member of the first tank configured to drive a flow of clear liquid to the first upstream duct and a flow of clear liquid to the second upstream duct.

4. The spraying system according to claim 3, wherein the reservoir is pressurized by means of a pressure member of the reservoir configured to drive a flow of active product from the reservoir to the first portion of the first downstream duct and/or a flow of grey liquid from the reservoir to the second portion of the first downstream duct.

5. The spraying system according to claim 1, wherein the first upstream duct is connected directly to the first upstream duct upstream of the regulating element, the first upstream duct comprising a stop valve configured to allow the clear liquid from the first upstream duct to be conveyed directly to the first downstream duct so that the clear liquid flushes the first downstream duct, forming the grey liquid from residues of active product mixed with the clear liquid.

6. The spraying system according to claim 5, wherein the second tank is connected to a recirculation duct.

7. The spraying system according to claim 1, comprising at least two reservoirs.

8. The spraying system according to claim 7, wherein the first portions of the first downstream ducts connected to each reservoir being convergent upstream of the mixing area of the spraying assembly and the second portions of the first downstream ducts being convergent upstream of the second tank.

* * * * *